(12) United States Patent
Byrne et al.

(10) Patent No.: US 8,370,359 B2
(45) Date of Patent: Feb. 5, 2013

(54) METHOD TO PERFORM MAPPINGS ACROSS MULTIPLE MODELS OR ONTOLOGIES

(75) Inventors: Brian Patrick Byrne, Austin, TX (US); Songyun Duan, Hawthorne, NY (US); Achille Fokoue-Nkoutche, Hawthorne, NY (US); Brendan O'Sullivan, Mulhuddart (IR); Kavitha Srinivas, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 12/909,264

(22) Filed: Oct. 21, 2010

(65) Prior Publication Data

US 2012/0102032 A1 Apr. 26, 2012

(51) Int. Cl.
*G06F 7/00* (2006.01)
*G06F 17/30* (2006.01)
(52) U.S. Cl. ........................ 707/737; 707/763
(58) Field of Classification Search .................. 707/763, 707/737
See application file for complete search history.

(56) References Cited

U.S. PATENT DOCUMENTS

| 6,772,180 B1* | 8/2004 | Li et al. ........................... 715/229 |
| 7,480,640 B1 | 1/2009 | Elad et al. |
| 2003/0174859 A1* | 9/2003 | Kim ................................ 382/100 |
| 2007/0150424 A1 | 6/2007 | Igelnik |

OTHER PUBLICATIONS

Li et al. "SEMINT: A tool for identifying attribute correspondences in heterogeneous databases using neural networks." Data and Knowledge Engineering 33 (2000) 49-84.*
Chen, et al., "The Structure and Dynamics of Co-citation Clusters: A Multiple-Perspective Co-citation Analysis," J. of the Amer. Soc. for Info. Sci. & Tech., Mar. 18, 2010, pp. 1-33.
Smiljanic, et al., "Using Element Clustering to Increase the Efficiency of XML Schema Matching," Data Engineering Workshops, 2006. Proc., Apr. 24, 2006, pp. 1-10.
Choi, et al., "A clustering method based on path similarities of XML data," Data & Knowledge Eng., vol. 60, Iss. 2, Feb. 2007, pp. 361-376.
Pluempitiwiriyawej, et al., "Element matching across data-oriented XML sources using a multi-strategy clustering model," Data & Knowledge Eng., vol. 48, Iss.3, 2004, pp. 297-333.
Rousseeuw, "Silhouettes: A graphical aid to the interpretation and validation of cluster analysis," J. of Computational and Applied Mathematics, 1987, pp. 53-65.
Janssens, et al., "A hybrid mapping of information science," Scientometrics, vol. 75, No. 3, 2008, pp. 607-631.
Bergamaschi, et al., "A new type of metadata for querying data integration systems," 15th Italian Symp. on Advanced DB Sys. (SEBD 2007), Jun. 17-20, 2007, pp. 1-8.
Hu, et al., "Matching large ontologies: A divide-and-conquer approach," Data & Knowledge Eng, vol. 67, Iss. 1, Oct. 2008, pp. 140-160.

* cited by examiner

*Primary Examiner* — Charles Lu
(74) *Attorney, Agent, or Firm* — William Stock

(57) ABSTRACT

Computer-implemented methods for mapping an element of a source information model to an element of a target information model, forming a cluster of elements for mapping across information models, and evaluating a mapping of elements across information models, and a system and computer program product thereof. The method of mapping an element of a source information model to an element of a target information model includes: receiving information for mapping a first element in a source cluster to an element in the target information model; mapping the first element to the target element using the received information for mapping the first element to the target element; and mapping all other elements in the source cluster to the target element.

10 Claims, 14 Drawing Sheets

METHOD TO PERFORM MAPPINGS ACROSS MULTIPLE MODELS OR ONTOLOGIES

BACKGROUND OF THE INVENTION

The present invention relates generally to methods and systems for performing and evaluating mappings across multiple information models. More particularly, the present invention relates to methods and systems for forming clusters of elements in an information model, mapping elements of a cluster in one information model to elements of another information model, and evaluating the mappings of the clustered elements.

An information model is a way of representing and managing information, such as data, relationships, services, and processes, in data processing systems for a particular domain or enterprise. Every day, organizations deal with a myriad of different semantic expressions in key information, and expend huge resources working around the inconsistencies, challenges and errors introduced by so many varying information models. Examples of information models are Entity-Relationship (ER) models, Unified Modeling Language (UML) models, Eclipse Modeling Framework (EMF) models, thesauri, ontologies or Extensible Markup Language (XML) schema.

These varying models rarely share a common terminology, because they have emerged as a result of several inputs. In some cases, mergers of organizations operating in the same industry result in different information models to express the same exact concepts. In other cases, they may have been developed by different individuals to express overlapping industry concepts, but in slightly different domains.

Irrespective of the means through which these models came about, today's organizations utilize many different information models and face an increasing need to integrate across these models, through data integration, shared processes and rules, or reusable services. In all of these cases, the ability to relate, or map, between elements of different information models is a critical foundation stone in addressing these challenges.

A mapping between information models involves the matching of elements of the models, which may be based on, for example, lexical names, semantics, and/or other attributes. In integrating data across heterogeneous information models, mismatches in terminology and semantics across sources lead to laborious manual efforts to map.

Extensive research exists in determining how to automate or semi-automate mappings across many different types of information models. For example, schema mapping is a well-studied area for databases, as is ontology mapping (also called ontology alignment). Products such as IBM's IDA, FastTrack, and Discovery are capable of performing such functionalities. However, the existing research and products are geared towards large sets of field-by-field or element-by-element mappings.

SUMMARY OF THE INVENTION

According to one aspect of the present invention, a method is provided for mapping an element of a source information model to an element of a target information model. The method includes: (i) receiving information for mapping a first element in a source cluster to one or more elements in the target information model, where the source cluster is a group of one or more elements in the source information model and the group is defined based on a relationship between the one or more elements in the source information model; (ii) mapping the first element in the source cluster to the one or more elements in the target information model using the received information for mapping the first element in the source cluster to the one or more elements in the target information model; (iii) and mapping all other elements in the source cluster to the one or more elements in the target information model.

According to another aspect of the present invention, a computer implemented method is provided for forming a cluster of elements for mapping across information models. The method includes: (i) receiving information about inter-element relationship for all elements of an information model; (ii) grouping a first set of elements from the information model into a first cluster based on the received information; (iii) obtaining a first quality metric for the first cluster; (iv) grouping a second set of elements from the information model into a second cluster based on the received information; and (v) obtaining a second quality metric for the second cluster.

According to yet another aspect of the present invention, a computer-implemented method is provided for evaluating a mapping of elements across information models. The method includes: (i) determining whether a first element in a source cluster has a corresponding element in a target information model, after attempting to map all elements in the source cluster to one or more elements in the target information model; and (ii) identifying a missed mapping between the first element in the source cluster to a corresponding element in the target information model, if the first element in the source cluster has no corresponding element in the target information model.

According to still another aspect of the present invention, a computer-implemented system is provided for evaluating a cluster of elements for mapping across information models. The system includes: an input receiving unit for receiving information for mapping a first element in a source cluster to an element in the target information model; and a mapping unit for (i) mapping the first element in the source cluster to the element in the target information model using the received information for mapping the first element in the source cluster to the element in the target information model, and (ii) mapping all other elements in the source cluster to the element in the target information model. The system may further include: a clustering unit for forming a new cluster of elements in the source information model; a quality metric unit for obtaining a quality metric; a cluster ranking unit for ranking clusters; a mapping evaluating unit for identifying a missed mapping; and an information model evaluating unit for identifying a modeling gap between the source information model and the target information model.

BRIEF DESCRIPTION OF THE DRAWINGS

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions. The following figures are included.

DETAILED DESCRIPTION OF THE PREFERRED EMBODIMENTS

It will be readily understood that the embodiments of the present invention, as generally described and illustrated in the figures herein, may be arranged and designed in a wide variety of different configurations in addition to the described presently preferred embodiments. Thus, the following detailed description of the embodiments of the present invention, as represented in the figures, is not intended to limit the scope of the invention, as claimed, but is merely representative of selected presently preferred embodiments of the invention. The following description is intended only by way of example, and simply illustrates certain selected presently preferred embodiments of the invention as claimed herein.

The embodiments of the present invention emphasize mapping sets or clusters of related elements within a source information model to either an element or a set of related elements within a target information model. These types of mapping support a more advanced inference of the semantics of elements in the source/target by comparing closely related clusters of elements. This in turn allows a more informed and accurate mapping than traditional element-by-element mapping.

Figure 1:
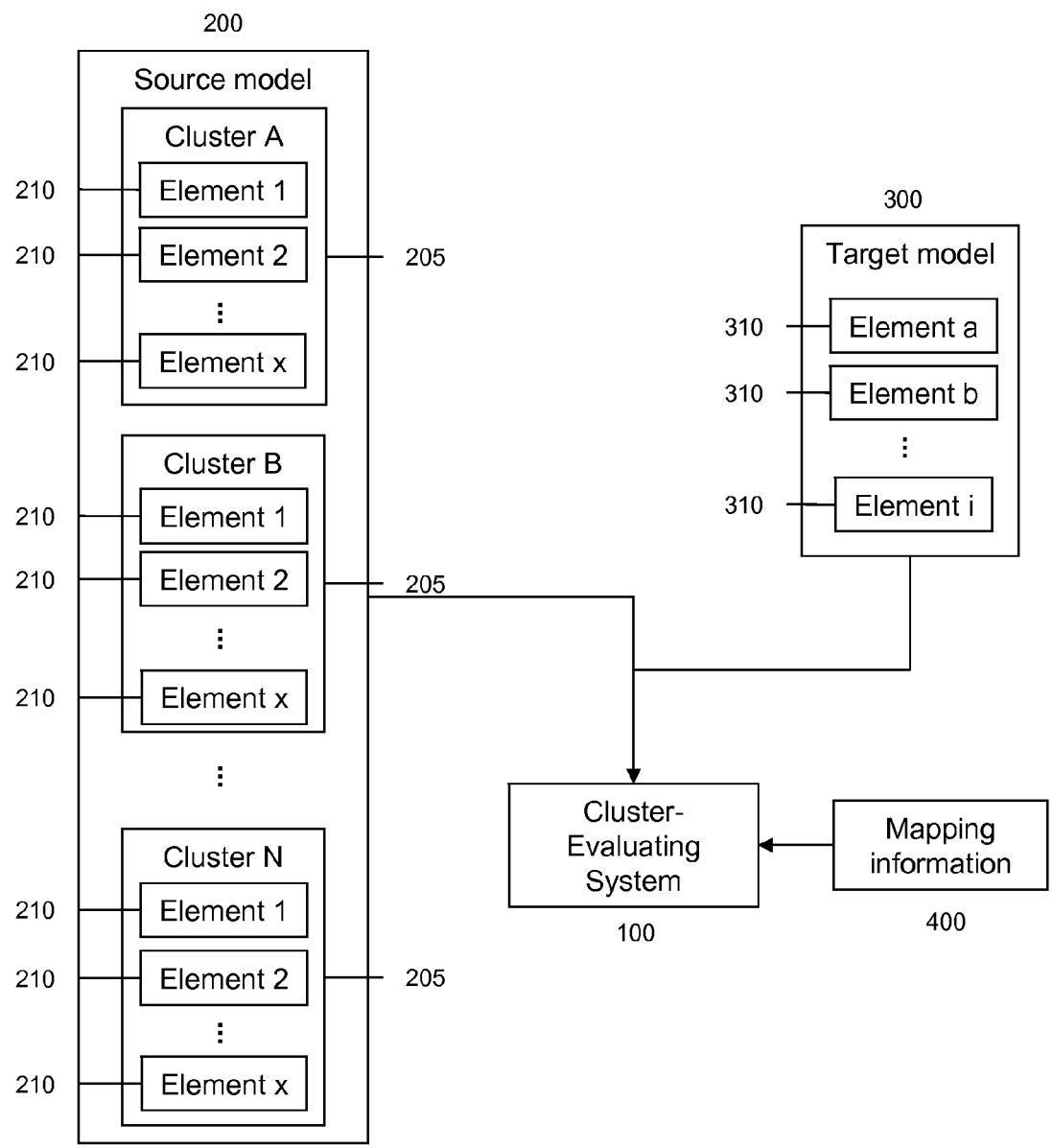
FIG. 1 is a block diagram that illustrates a computer-implemented system for evaluating a cluster of elements for mapping across information models according to an embodiment of the present invention.

Referring to FIG. 1, a block diagram illustrates a computer-implemented system for evaluating a cluster of elements for mapping across information models according to an embodiment of the present invention. The system 100 receives content from a source information model 200, content from a target information model 300, and information ("mapping information") 400 about how to map certain elements in the source information model 200 to elements in the target information model 300.

The source information model 200 contains clusters 205 of elements 210. Each cluster 205 ("source cluster") is a group of elements 210 that has been defined based on a relationship between the elements 210. The clusters 205 may be previously defined by existing techniques such as K-means and hierarchical clustering. The source information model 201 may also contain unclustered elements (not shown in the figure.)

The target information model 300 contains elements 310. In the figure, the elements 310 are unclustered but in other embodiments of the present invention, the target information model may contain clustered elements or a combination of clustered elements and unclustered elements.

A mapping involves the matching of elements of different information models, which may be based on lexical names, semantics and/or other attributes. As such, the mapping information 400 may be in the form of user feedback or computer-generated code or instructions.

Figure 2:
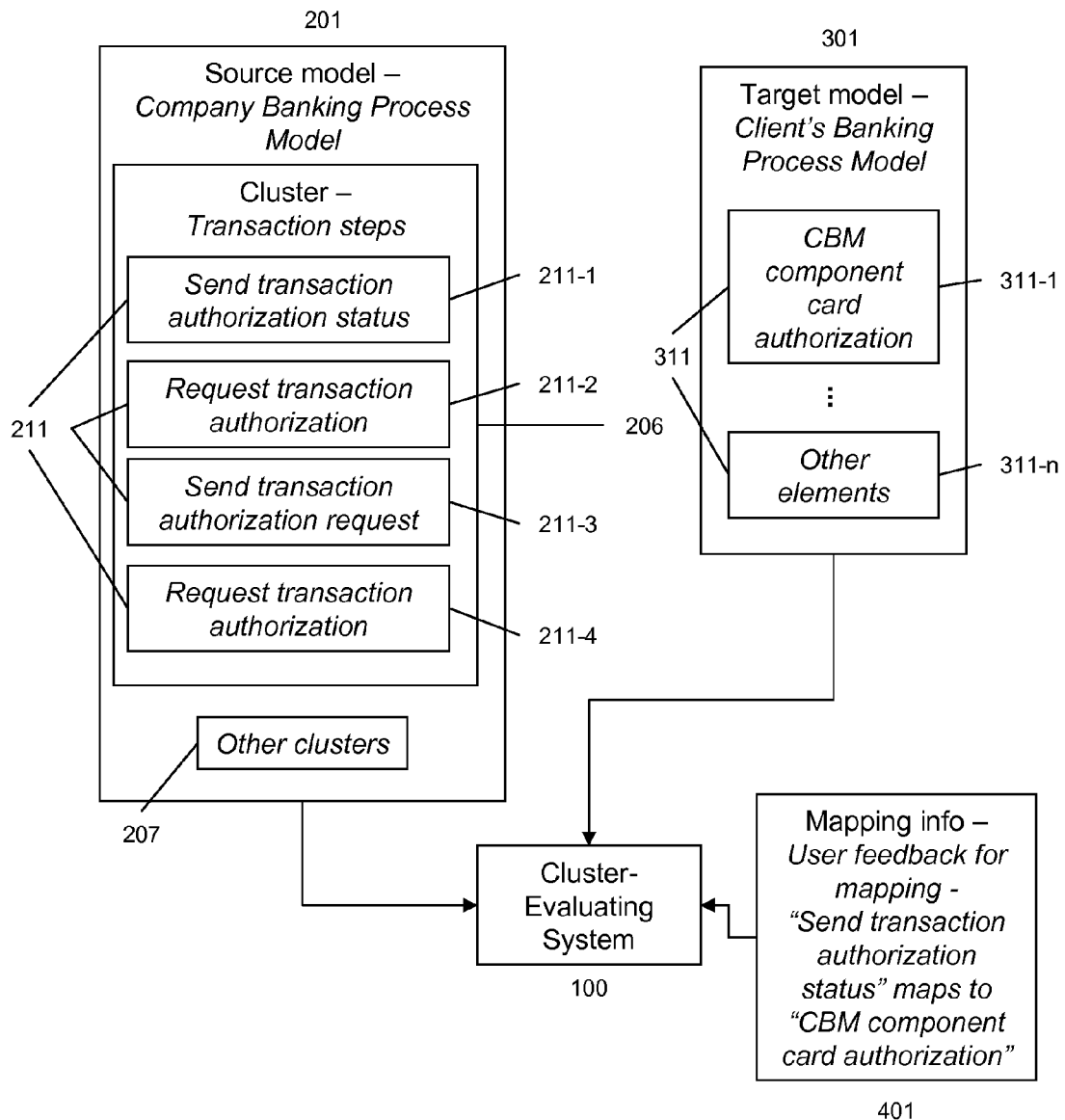
FIG. 2 is a block diagram that illustrates an example source information model, target information model, and mapping information according to the embodiment of the present invention.

FIG. 2 shows an example source information model 201, which is a banking company's process model from the company's banking software. In cluster 206, which is a cluster of steps taken in one particular banking transaction, the elements 211 may include the steps of: sending transaction authorization status 211-1, requesting transaction authorization 211-2, sending transaction authorization request 211-3, and requesting transaction authorization request 211-4.

An example target information model 301 is a client's banking process model from the client's banking software. In this target information model 301, the elements 311, 312 are unclustered.

The cluster-evaluating system 100 receives mapping information 401 in the form of user feedback for how to map an element 211 in the source cluster 206 to an element 311 in the target information model 301. Here, the mapping information 401 is to map "Send transaction authorization status" 211-$i$ to "CBM component card authorization" 311-$i$.

Figure 3:
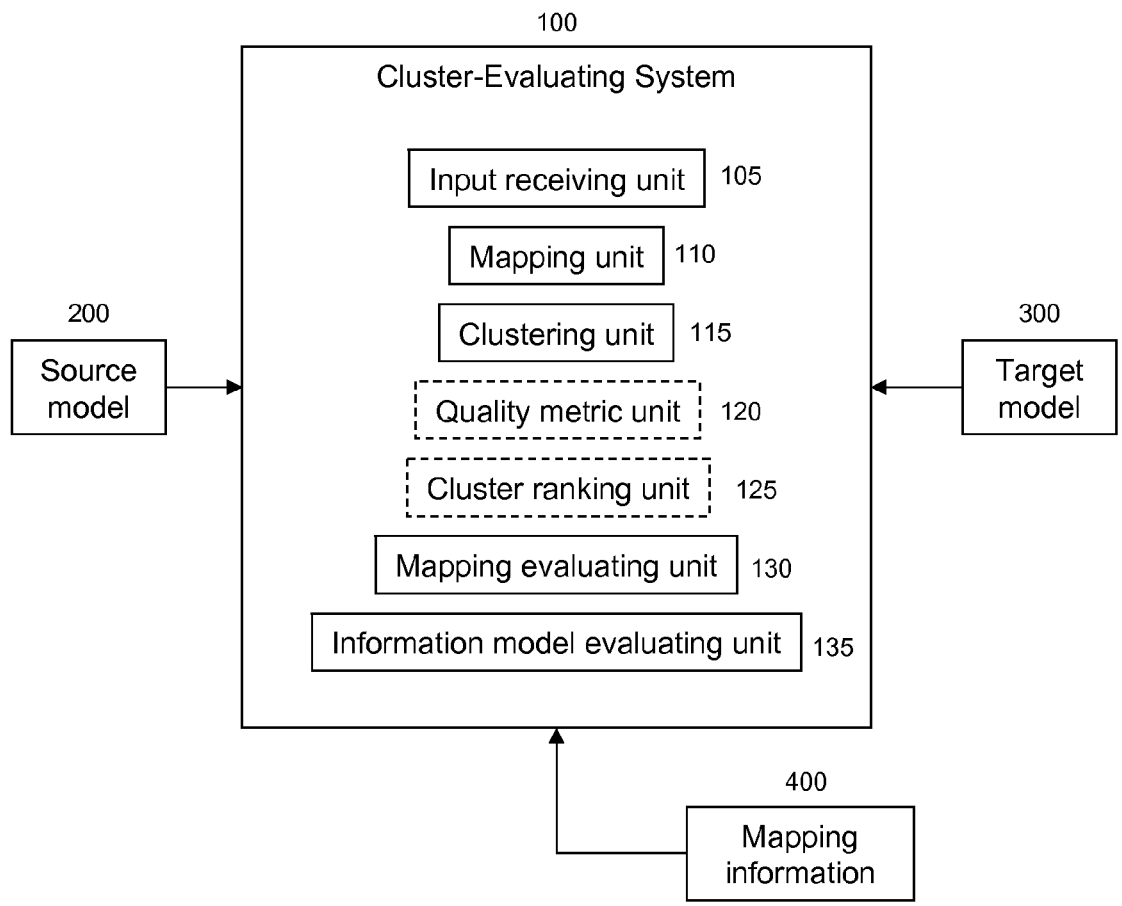
FIG. 3 is a block diagram that illustrates the details of the system according to the embodiment of the present invention.

Referring to FIG. 3, a block diagram illustrates the details of the cluster-evaluating system 100 according to the embodiment of the present invention. The system 100 includes: an input receiving unit 105, a mapping unit 110, a clustering unit, 115, an optional quality metric unit 120, an optional cluster ranking unit 125, a mapping evaluating unit 130, and an information model evaluating unit 135.

The input receiving unit 105 is responsible for receiving content from the source information model 200, content from the target information model 300, and the mapping information 400. The mapping unit 110 is responsible for mapping elements of the source information model 200 to elements of the target information model 300 based on the received mapping information 400.

Figure 4:
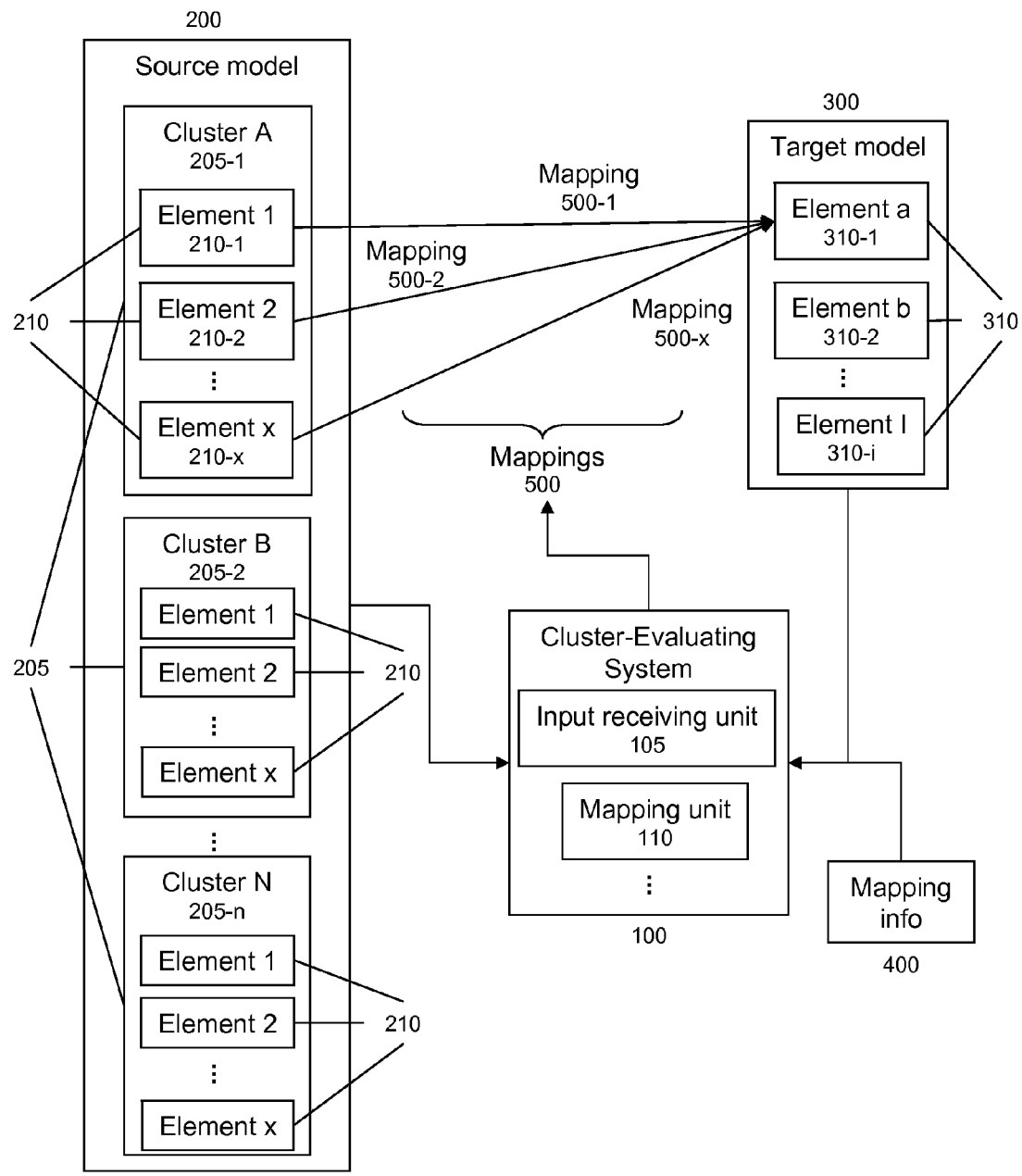
FIG. 4 is a block diagram that illustrates the mappings between elements in a cluster of a source information model to an element in the target information model according to the embodiment of the present invention.

Referring to FIG. 4, a block diagram illustrates the mappings between elements 210 in source cluster 205-1 to element 310-1 in the target information model 300 according to the embodiment of the present invention. The input receiving unit 105 first receives content from the source information model 200, content from the target information model 300, and the mapping information 400, i.e., information about how to map one element 210 of a cluster 205-1 or which target element 310 to map the element 210 to. Thereafter, the mapping unit 110 performs a mapping of that particular element 210 to the target element 310-1 and performs mappings of all other elements 210 in the same cluster 205-1 to the same target element 310-1. Because the elements of the source cluster 205-1 are related, the mapping of one particular element 210 in this cluster 205-1 to the target element 310-1 allows for the assumption that the same target element 310-1 is a potential corresponding element for the other elements 210 of the source cluster 205-1. This improves both accuracy and efficiency. Since mapping is done by looking at a cluster of source elements, it can leverage more information than mapping individual elements separately; thus it improves accuracy. Meanwhile, the mapping of one element in the source cluster can be generalized to mapping of the other elements in the same cluster, it requires less effort than the situation of mapping all elements in the same cluster from scratch; thus it improves efficiency.

Figure 5:
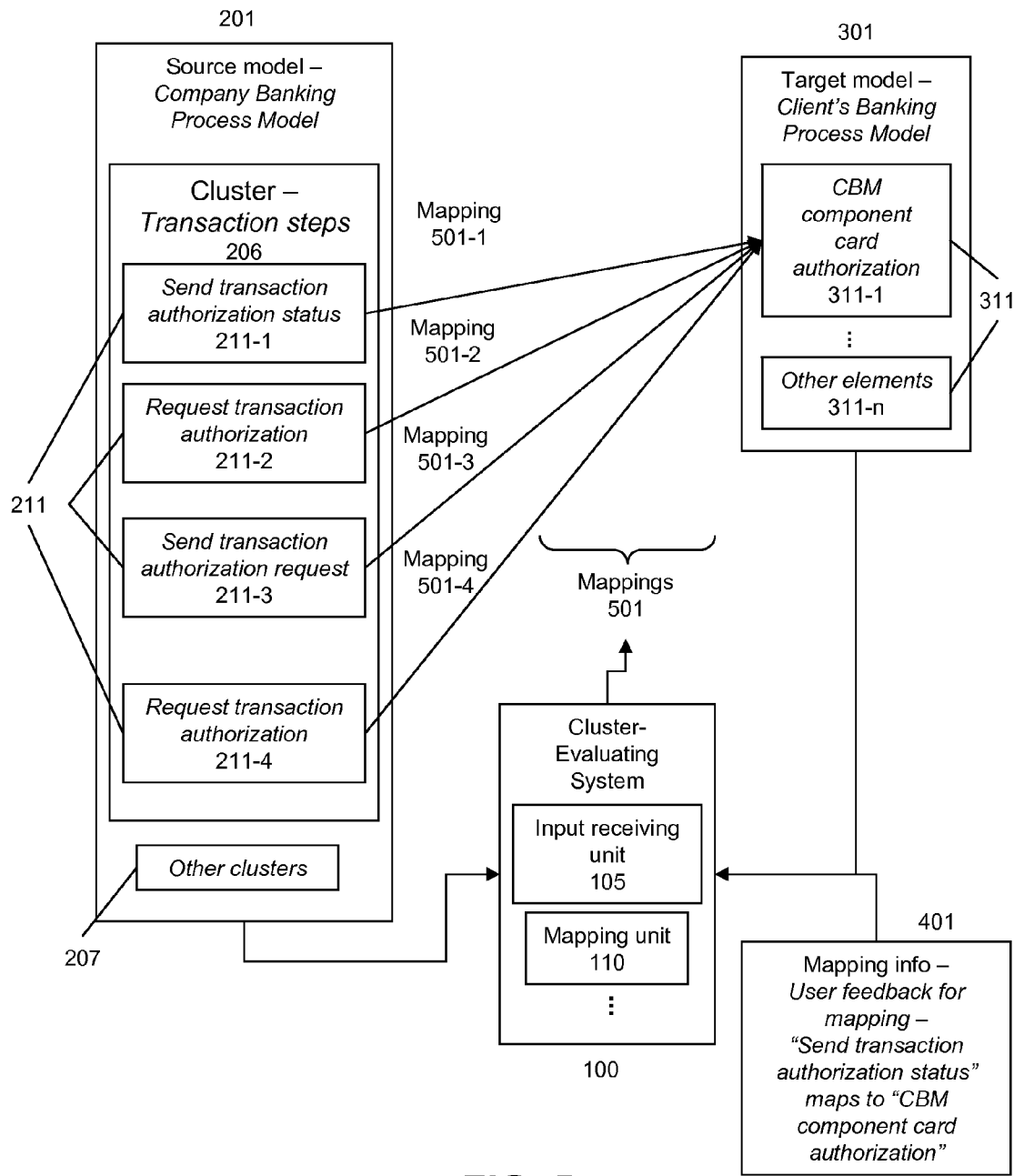
FIG. 5 is a block diagram that illustrates mappings from elements of the example source information model to an element of the example target information model discussed with reference to FIG. 2

FIG. 5 shows mappings from elements of the example source information model 201 to an element in the example target information model 301 discussed with reference to FIG. 2. The input receiving unit 105 first receives content from the source information model 201, content from the target information model 301, and mapping information 401. In this example, the mapping information 401 is user feedback that provides the mapping unit 110 an instruction to map the element "Send transaction authorization status" 211-1 to the element "CBM component card authorization" 311-1. Thereafter, the mapping unit 110 performs a mapping between these elements 211-1, 311-1 and performs mappings of all other elements 501-2, 501-3, 501-4 in the cluster 206 to the same target element 311-1.

Figure 6:
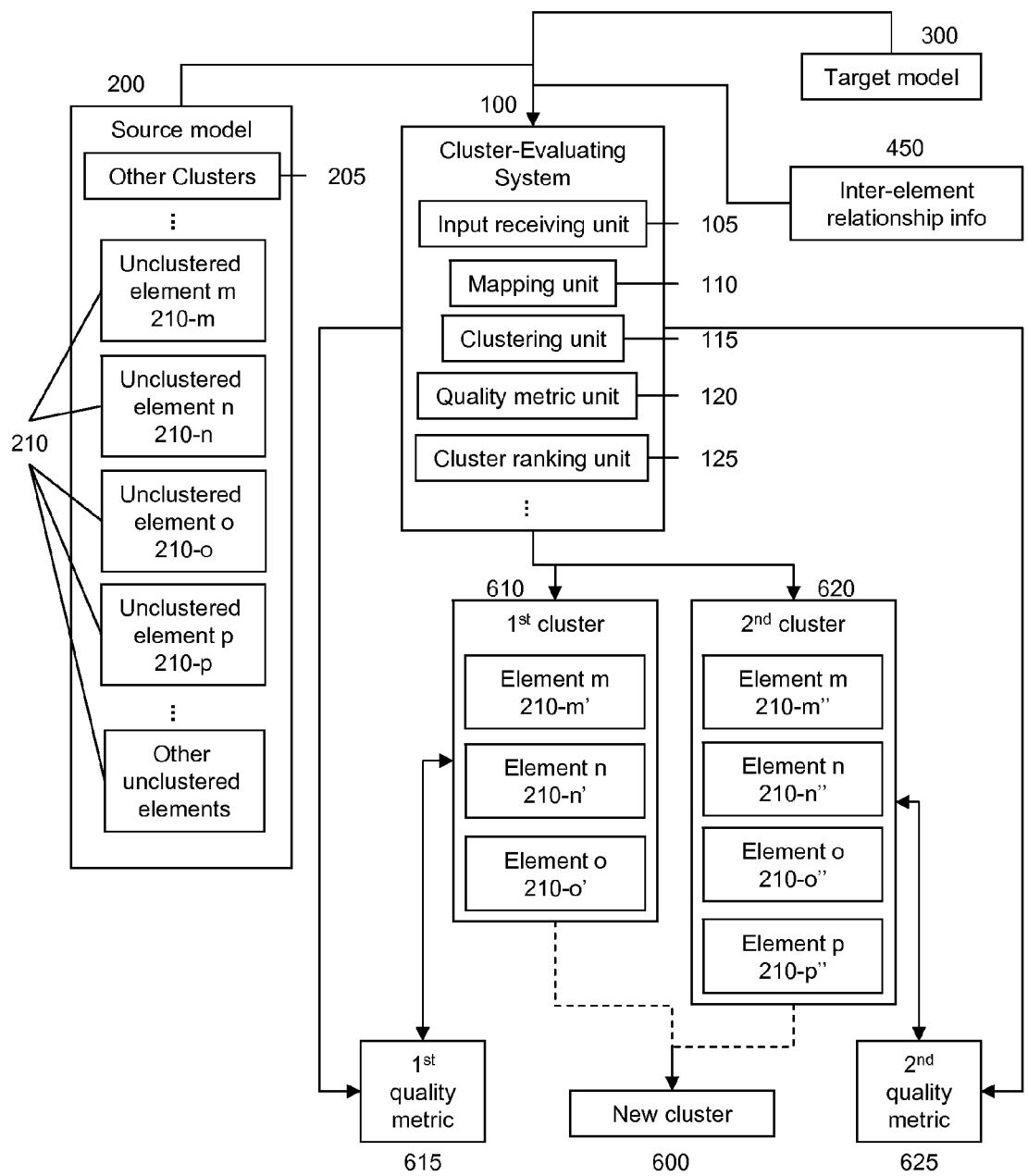
FIG. 6 is a block diagram that illustrates the clusters formed by the clustering unit of the system according to the embodiment of the present invention.

Referring to FIG. 6, a block diagram illustrates the formation of a new cluster 600 by the clustering unit 115 of the cluster-evaluating system 100 according to the embodiment of the present invention. The clustering unit 115 is responsible for forming a new cluster 600 of elements 210 in the source information model 200. The new cluster 600 may be a grouping of unclustered elements that are closely related, a regrouping of previously clustered elements, or a grouping of unclustered and previously clustered elements. After the new cluster 600 is formed, the elements of the new cluster 600 may be mapped by the mapping unit 110 in a similar manner as described above.

The new cluster is a "high quality" cluster in that the elements in the new cluster are more closely related in comparison with other elements in the source information model. In addition, the new cluster is high quality in that the number of elements in the cluster is maximized conditioned on the first requirement, i.e., closely related. The intuition is that treating one element as a singleton cluster does not provide any benefit.

In the example shown in FIG. 6, the clustering unit 115 forms the new cluster 600 using unclustered elements 210-$m$, 210-$n$, 210-$o$, 210-$p$ in the source information model 200. In order to form the new cluster 600 according to this embodiment of the present invention, the input receiving unit 105 first receives information about inter-element relationships 450 for all elements 210 of the source information model 200. The inter-element relationship information 450 may be in the form of user input or computer-generated code or instructions. For example, the inter-element relationship can be measured by the lexical similarity of their names, labels, or documentation, etc.

Assuming that the inter-element relationship information 450 suggests that one potential combination or set of elements to be grouped are unclustered elements 210-$m$, 210-$n$, 210-$o$ and another potential set of elements to be grouped are unclustered 210-$m$, 210-$n$, 210-$o$, 210-$p$, the clustering unit 115 groups the first potential set of elements into a first cluster 610 and the second potential set of elements into a second cluster 620. The clustering unit 115 further obtains a quality metric 615 for the first cluster 610 and a quality metric 625 for the second cluster 620 to determine whether the first cluster 610 or the second cluster 620 contain the best set of closely-related elements. Based on the quality metrics 615, 625, the clustering unit 115 selects either the first cluster 610 or the second cluster 620 as the new cluster 600.

To obtain the quality metrics 615, 625, the clustering unit 115 first obtains or computes a silhouette metric for each cluster 610, 620. Next, the clustering unit 115 obtains or computes an aggregation metric for clusters 610, 620. The quality metrics 615, 625 are essentially the computed aggregation metrics and as such, the cluster unit 115 selects the cluster having the best aggregation metric as the new cluster 600.

The cluster-evaluating system 100 may optionally include a quality metric unit 120 that computes the quality metrics 615, 625 for the first and second clusters 610, 620 and a cluster ranking unit 125 that performs the comparison of the first and second clusters 610, 620 to determine which is the higher quality cluster to be selected as the new cluster 600.

The silhouette metric measures the relative ratio of the intra-cluster distance or dissimilarity to the inter-cluster distance or dissimilarity. Loosely speaking, the average silhouette score of all the elements in the same cluster measures the compactness of this cluster. A formula for silhouette metric is: $S(i)=[b(i)-a(i)]/\max\{b(i), a(i)\}$ for computing the score of the i-th element in a given cluster C, where $a(i)$ is the average distance or dissimilarity of this element to the other elements in cluster C, $b(i)$ is the minimum of the average of this element to the other clusters (excluding C). Therefore, $S(i)$ is in the range of $[-1, 1]$. A larger value yields better clustering results.

As a concrete example, suppose there are 4 points in Euclidean space, points A(0, 0), B(0, 3), C(4, 0) and D(9,0). Furthermore, suppose A and B are in cluster 1, and C and D are in cluster 2. The silhouette score for point A is computed as follows: distance(A, B)=3, distance(A, C)=4, distance(A, D)=9, so the silhouette score for A is (6.5−3)/6.5. Similarly, the silhouette score for C is computed as follows: distance(C, D)=5, distance(C, A)=4, distance(C, B)=5, so silhouette score for C is (4.5−5)/5, which is negative. Thus, the cluster containing A and B is more compact than the cluster containing C and D.

The aggregation metric estimates the overall clustering quality, which has the formula of average_silhouette/#clusters, where average_silhouette is the average silhouette score of the K elements, while #cluster is the number of clusters produced by the clustering algorithm. Consider one extreme case where each element is put into a separate cluster to generate K clusters. The aggregation metric in this case is 1/K. Consider another extreme case where all K elements are put into one cluster. The aggregation metric here is average_silhouette/1. These two extreme are not useful in practice, since it does not bring any benefit of clustering to reduce user feedback or input for model mapping. Intuitively, the optimal number of clusters produced between 1 and K will be able to maximize the aggregation metric, which is thus used in our strategy to find the best clustering strategy.

The inter-element relationship information 450 received by the input receiving unit 105 contains user input or computer-generated code or instructions, which may be measured by the lexical similarity of their names, labels, or documentation, etc., so that the clustering unit 115 is able to compute the silhouette and aggregation metrics.

Figure 7:
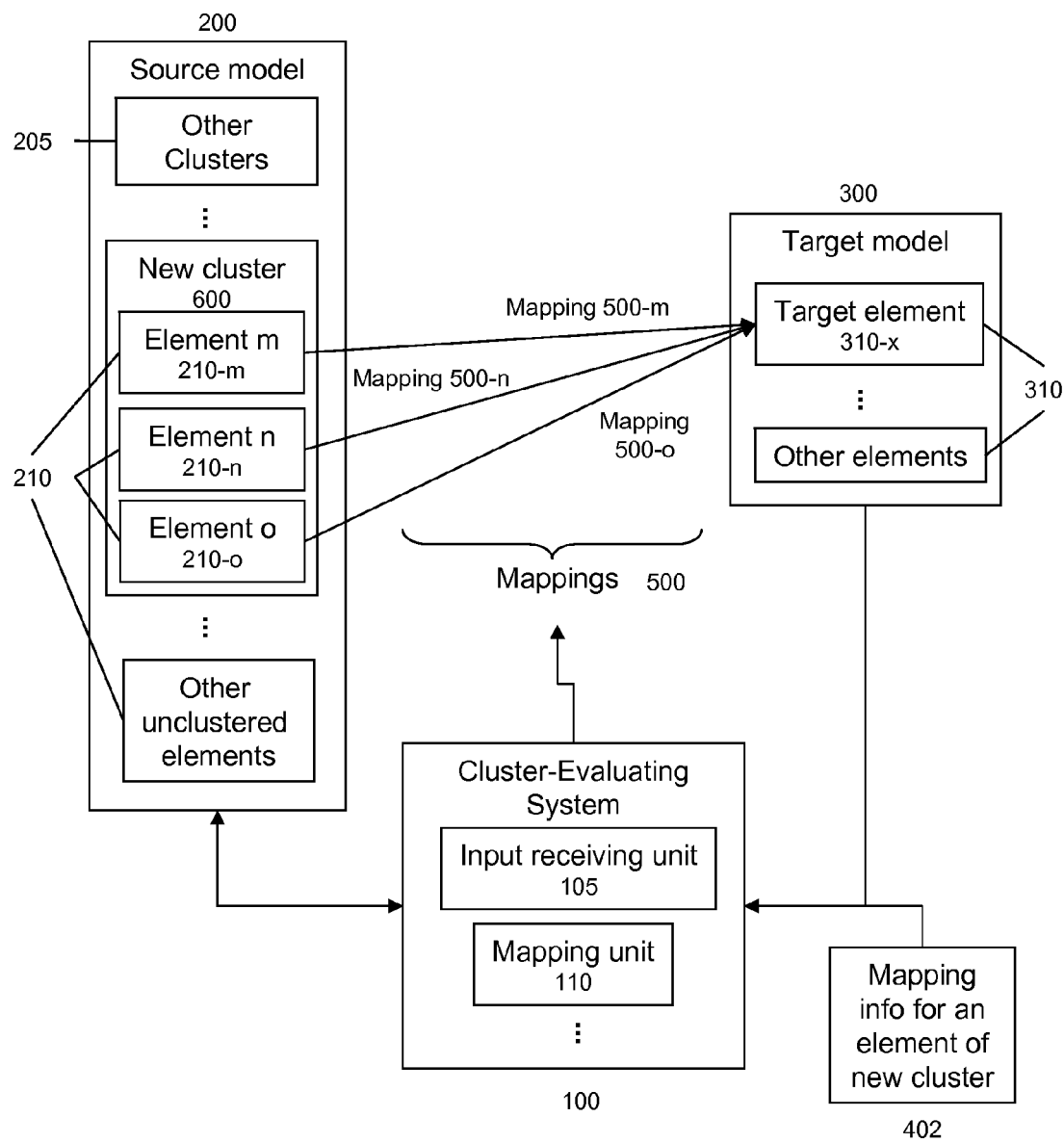
FIG. 7 is a block diagram that illustrates the mappings between elements of the newly formed cluster of the source information model to an element in the target information model according to the embodiment of the present invention.

Referring to FIG. 7, a block diagram illustrates the mappings between elements 210-$m$, 210-$n$, 210-$o$ in the newly formed cluster 600 in the source information model 200 to an element 310-$x$ in the target information model 300 according to the embodiment of the present invention. The input receiving unit 105 first receives mapping information for one of the elements, 210-$m$, 210-$n$, or 210-$o$, of the new cluster 402. Assuming that the instruction from the mapping information 402 is to map element 210-$m$ to target element 310-$x$, the mapping unit 110 performs a mapping of element 210-$m$ to the target element 310-$x$ and a mapping of elements 210-$n$, 210-$n$ to the same target element 310-$x$.

Figure 8:
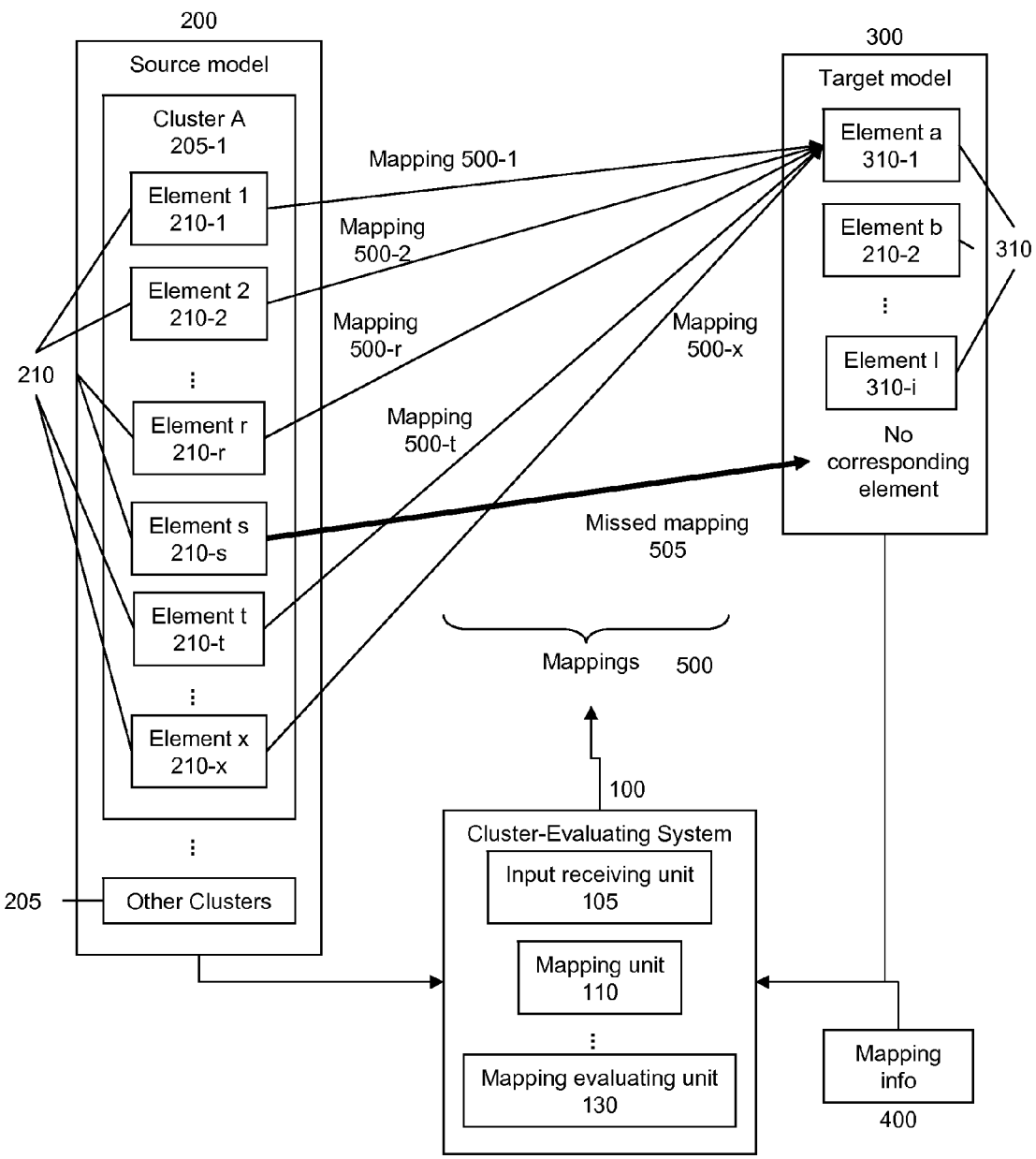
FIG. 8 is a block diagram that illustrates the identification of a missed mapping by the mapping evaluating unit of the system according to the embodiment of the present invention.

Referring to FIG. 8, a block diagram illustrates the identification of a missed mapping 505 by the mapping evaluating unit 130 of the system 100 according to the embodiment of the present invention. The mapping evaluating unit 130 is responsible for identifying a missed mapping 505 between one of the elements 210 of the source cluster 205 to the target element 310 after an attempt has been made to map all elements 210 of the source cluster 205 to the target element 310.

For example, suppose that the mapping unit 110 has made an attempt to map all elements 210 of cluster 205-1 to target element 310-1. For each element, 210-1, 210-2, ..., 210-$r$, 210-$s$, 210-$t$, ..., 210-$x$, of the source element hat has been mapped, the mapping evaluating unit 130 will then perform a search for a corresponding element, that is, the target element of which the source element has been mapped to. For instance, suppose we have a cluster of {a1, a2, a3}. In the mapping files provided as input, we see both a1 and a2 are mapped to b1. In this case, we detect the missed mapping of a3 to b1.

In this example, a mapping exists between source element 210-1 to target element 310-1, between source element 210-2 to target element 310-1, between source element 210-$r$ to target element 310-1, between source element 210-$t$ to target element 310-1, and between source element 210-$x$ to target element 310-1. However, because there is no corresponding target element for source element 210-$s$, the mapping evaluating unit 130 identifies a missed mapping 505 as between source element 210-$s$ to a target element 310.

Although this example is discussed with reference to mappings performed by the mapping unit 110, in other embodiments of the present invention, the mapping evaluating unit 130 may also identify missed mappings for mapping attempts that are not performed by the mapping unit 110.

Figure 9:
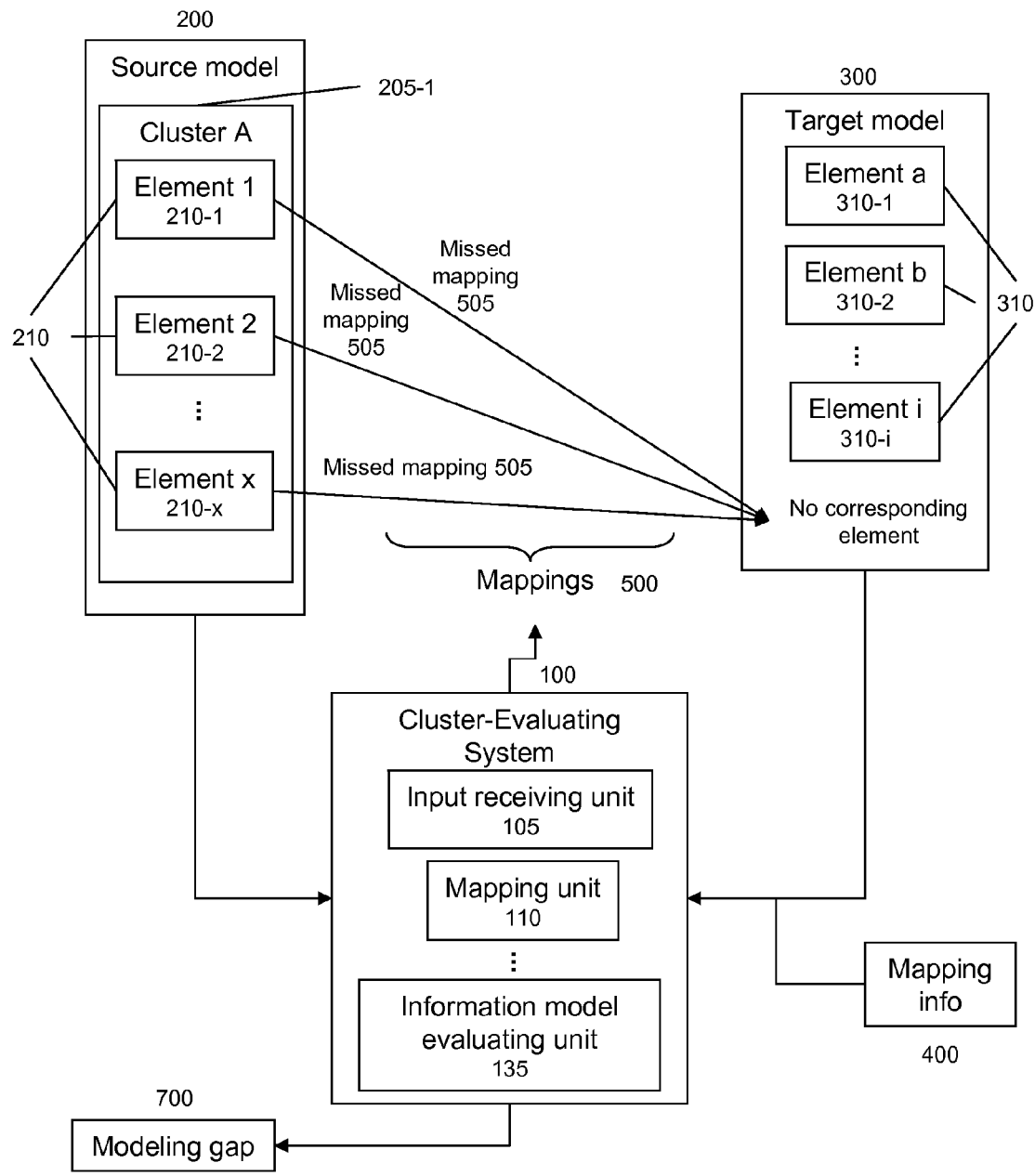
FIG. 9 is a block diagram that illustrates the identification of a modeling gap by the information model evaluating unit of the system according to the embodiment of the present invention.

Referring to FIG. 9, a block diagram illustrates the identification of a modeling gap 700 by the information model evaluating unit 135 according to the embodiment of the present invention. The information model evaluating unit 135 is responsible for identifying a modeling gap 700 between the source information model 200 and the target information model 300.

For example, suppose that the mapping unit 110 has made an attempt to map all elements 210 of cluster 205-1 to an element 310 of the target information model 300 based on the mapping information 400. Similar to the mapping evaluating unit 130 described with reference to FIG. 8, for each element, 210-1, 210-2, ..., 210-$x$, of the source element hat has been mapped, the information model evaluating unit 135 will then perform a search for a mapping for a corresponding element, that is, the target element of which the source element has been mapped to. If all the elements in a source cluster are not mapped to any element in the target information model, there may be an information gap.

In this example, because there is no corresponding target element for all source elements 210-1, 210-2, ..., 210-$x$, the information model evaluating unit 135 identifies a missed mapping 505 as between these source elements 210-1, 210-2, ..., 210-$x$ to a target element 310. Since all attempted mappings 500 are missed mappings 505, the information model evaluating unit 135 identifies that there is a modeling gap between the two information models 200, 300.

Although this example is discussed with reference to mappings performed by the mapping unit 110, in other embodiments of the present invention, the mapping evaluating unit 130 may also identify missed mappings for mapping attempts that are not performed by the mapping unit 110.

Figure 10:
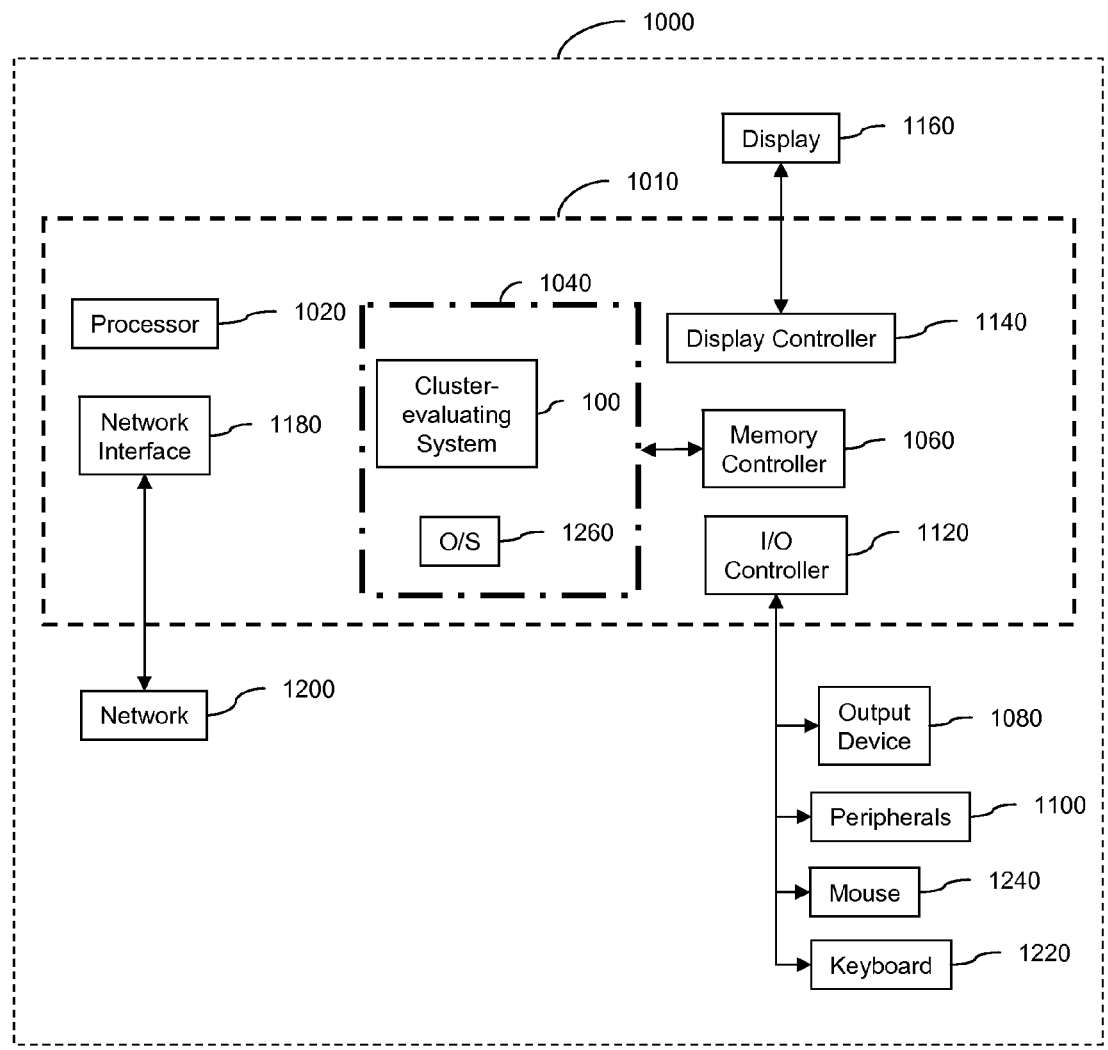
FIG. 10 is a block diagram that illustrates a computer-implemented system that includes the system for evaluating a cluster of elements for mapping across information models to an embodiment of the present invention.

Referring to FIG. 10, a block diagram illustrates a computer-implemented system 1000 that includes the system 100 for evaluating a cluster of elements for mapping across information models to an embodiment of the present invention. An exemplary computing system 1000 includes a cluster-evaluating system 100 in a computer 1010. As can be appreciated, the computing system 1000 may include any computing device, including but not limited to, a desktop, a laptop, a server, a portable handheld device, or any other electronic device. For ease of the discussion, an embodiment of the invention will be discussed in the context of the computer 1010.

The computer 1010 is shown to include a processor 1020, memory 1040 coupled to a memory controller 1060, one or more input and/or output (I/O) devices, peripherals 1080, 1100 that are communicatively coupled via a local input/output controller 1120, and a display controller 1180 coupled to a display 1160. In an exemplary embodiment, the system 1000 can further include a network interface 1140 for coupling to a network 1200. The network 1200 transmits and receives data between the computer 1010 and external systems. In an exemplary embodiment, a conventional keyboard 1220 and mouse 1240 can be coupled to the input/output controller 1200.

In various embodiments of the present invention, the memory 1040 stores instructions that can be executed by the processor 1020. The instructions stored in memory 1040 may include one or more separate programs, each of which comprises an ordered listing of executable instructions for implementing logical functions. In the example of FIG. 10, the instructions stored in the memory 1040 include at least a suitable operating system (OS) 1260 and cluster-evaluating system 100. The operating system 1260 essentially controls the execution of other computer programs and provides scheduling, input-output control, file and data management, memory management, and communication control and related services.

When the computer 1010 is in operation, the processor 1020 is configured to execute the instructions stored within the memory 1040, to communicate data to and from the memory 1040, and to generally control operations of the computer 1010 pursuant to the instructions. The processor 1020 may be any custom made or commercially available processor, a central processing unit (CPU), an auxiliary processor among several processors associated with the computer 1010, a semiconductor based microprocessor (in the form of a microchip or chip set), a macroprocessor, or generally any device for executing instructions.

The processor 1020 executes the instructions of the cluster-evaluating system 100 according to embodiments of the present invention. In various embodiments, the cluster-evaluating system 100 of the present invention is stored in the memory 1040 (as shown), is executed from a portable storage device (e.g., CD-ROM, Diskette, FlashDrive, etc.) (not shown), and/or is run from a remote location such as from a central server (not shown). The cluster-evaluating system 100 may be a software application that carries out processes such as those described below with reference to FIGS. 11, 12, and 13. In some embodiments, the memory 1040 also stores data, such as content from the source information model 200, content from the target information model 300, and mapping information 400, that are shown in FIG. 1, and inter-element relationship information 450 shown in FIG. 6.

Figure 11:
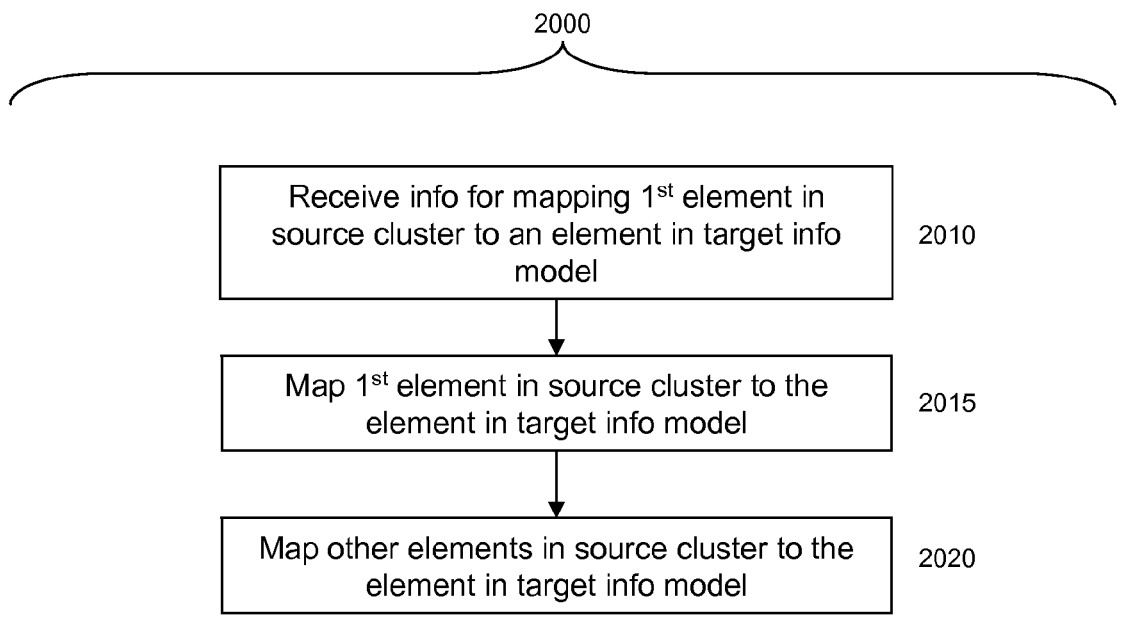
FIG. 11 is a flow chart that illustrates a computer-implemented method of mapping an element of a source information model to an element of a target information model according to an embodiment of the present invention.

Referring to FIG. 11, a flow chart illustrates a computer-implemented method of mapping an element of a source information model to an element of a target information model according to an embodiment of the present invention.

The source information model contains clusters of elements. Each cluster ("source cluster") is a group of elements that has been defined based on a relationship between the elements. The clusters may be previously defined by existing techniques such as K-means and hierarchical clustering. The target information model contains elements that may be clustered or unclustered.

The method 2000 starts at step 2010, where information is received about how to map an element ("first element") in the source cluster to a designated or target element in the target information model. The information about how to map the first element in the source cluster to an element in the target information model may be received, for example, by using the input receiving unit 105 described with reference to FIG. 3 to collect information from a user's input or a mapping software.

At step 2015, a mapping is performed between the first element in the source cluster and the target element. At step 2020, a mapping is performed between all other elements in the source cluster and the same target element. Because the elements of the source cluster are related, the mapping of one particular element in this cluster to the target element allows for the assumption that the same target element is a potential corresponding element for the other elements of the source cluster. This improves both accuracy and efficiency. Since mapping is done by looking at a cluster of source elements, it can leverage more information than mapping individual elements separately; thus it improves accuracy. Meanwhile, the mapping of one element in the source cluster can be generalized to mapping of the other elements in the same cluster, it requires less effort than the situation of mapping all elements in the same cluster from scratch; thus it improves efficiency.

Figure 12:
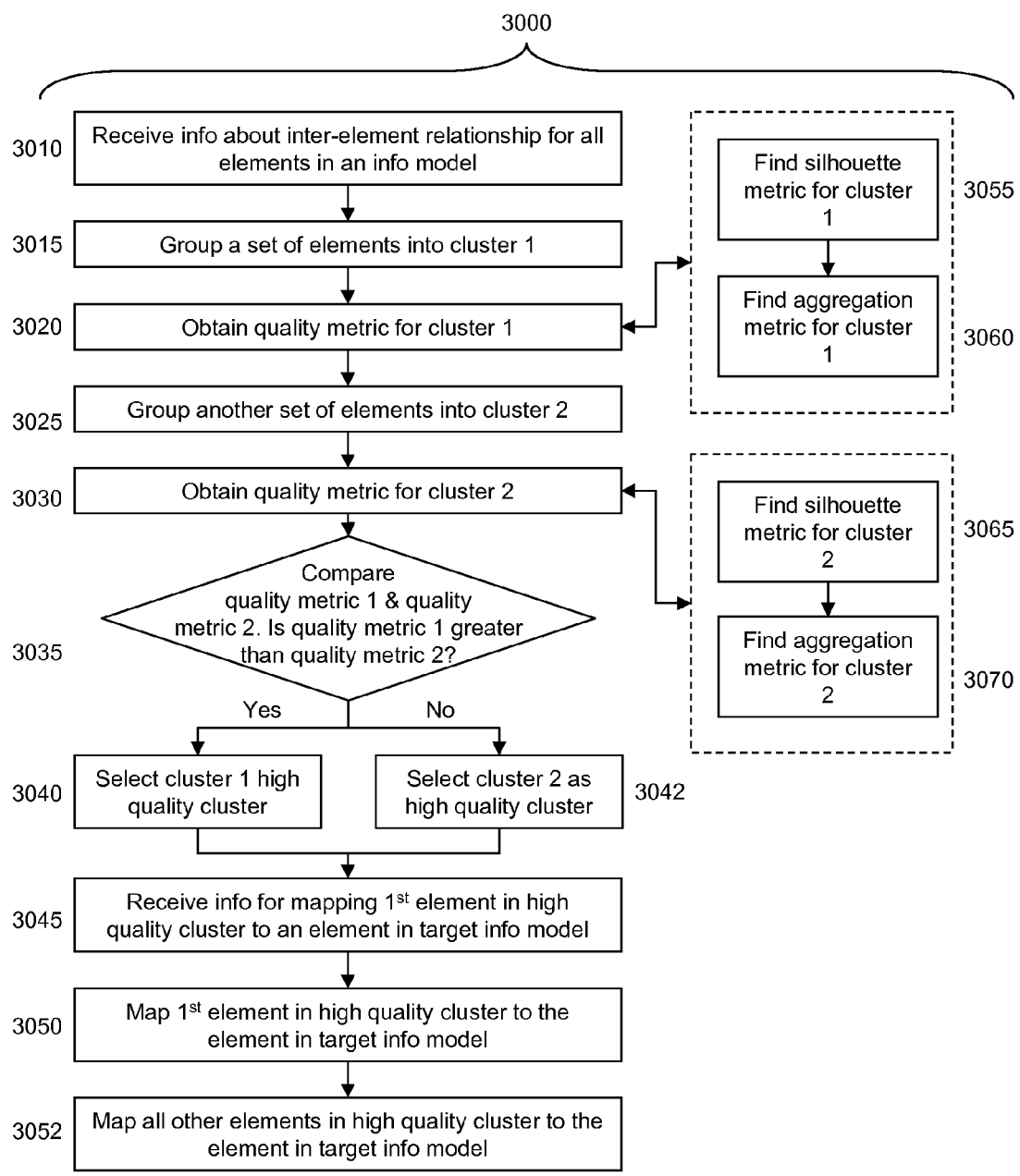
FIG. 12 is a flow chart that illustrates a computer-implemented method of forming a cluster of elements for mapping across information models according to an embodiment of the present invention.

Referring to FIG. 12, a flow chart illustrates a computer-implemented method of forming a cluster of elements for mapping across information models according to an embodiment of the present invention. In forming this new cluster of elements, the quality of the cluster is taken into account. In other words, a "high quality" cluster would be one that contains elements that are more closely related in comparison with other elements in the information model. In addition, the new cluster is high quality in that the number of elements in the cluster is maximized conditioned on the first requirement, i.e., closely related. The intuition is that treating one element as a singleton cluster does not provide any benefit.

The method 3000 starts at step 3010, where information is received about the inter-element relationship for all the elements of an information model. The inter-element relationship information may be in the form of user input or computer-generated code or instructions. For example, the inter-element relationship can be measured by the lexical similarity of their names, labels, or documentation, etc.

Based on this information, a first set of elements is grouped into a first cluster at step 3015. Next, a quality metric is obtained for the first cluster at step 3020. A second set of elements is grouped into a second cluster based on the inter-element relationship information at step 3025. A quality metric is also obtained for the second cluster, step 3030.

To obtain the quality metric for the first or second cluster, a silhouette metric for the cluster is first computed, steps 3055, 3065. Next, an aggregation metric is computed based on the silhouette metric, steps 3060, 3070. Descriptions for the silhouette metric and the aggregation metric are discussed above with reference to other embodiments and will thus be omitted here.

The quality metric is the computed aggregation metric. By finding the quality metric for each cluster, a determination may be made as to whether the first cluster or the second cluster should be selected as the higher quality cluster. At step 3035, the quality metric for the first cluster is compared with the quality metric for the second cluster to make this determination. If the quality metric for the first cluster is greater than the quality metric for the second cluster, then the method continues to step 3040, where the first cluster is selected as the high quality cluster. If the quality metric for the second cluster is greater than the quality metric, then the method continues to step 3042, where the second cluster is selected as the high quality cluster. If both clusters have the same quality metric, then either cluster may be selected as the high quality cluster. The tie may be broken by random using an appropriate existing code.

At step 3045, information is received as to how to map an element in the high quality cluster to one or more elements in a target information model. At step 3050, a mapping is performed between the first element in the high quality cluster and the target element. At step 3052, a mapping is performed between all other elements in the high quality cluster and the target element.

Figure 13:
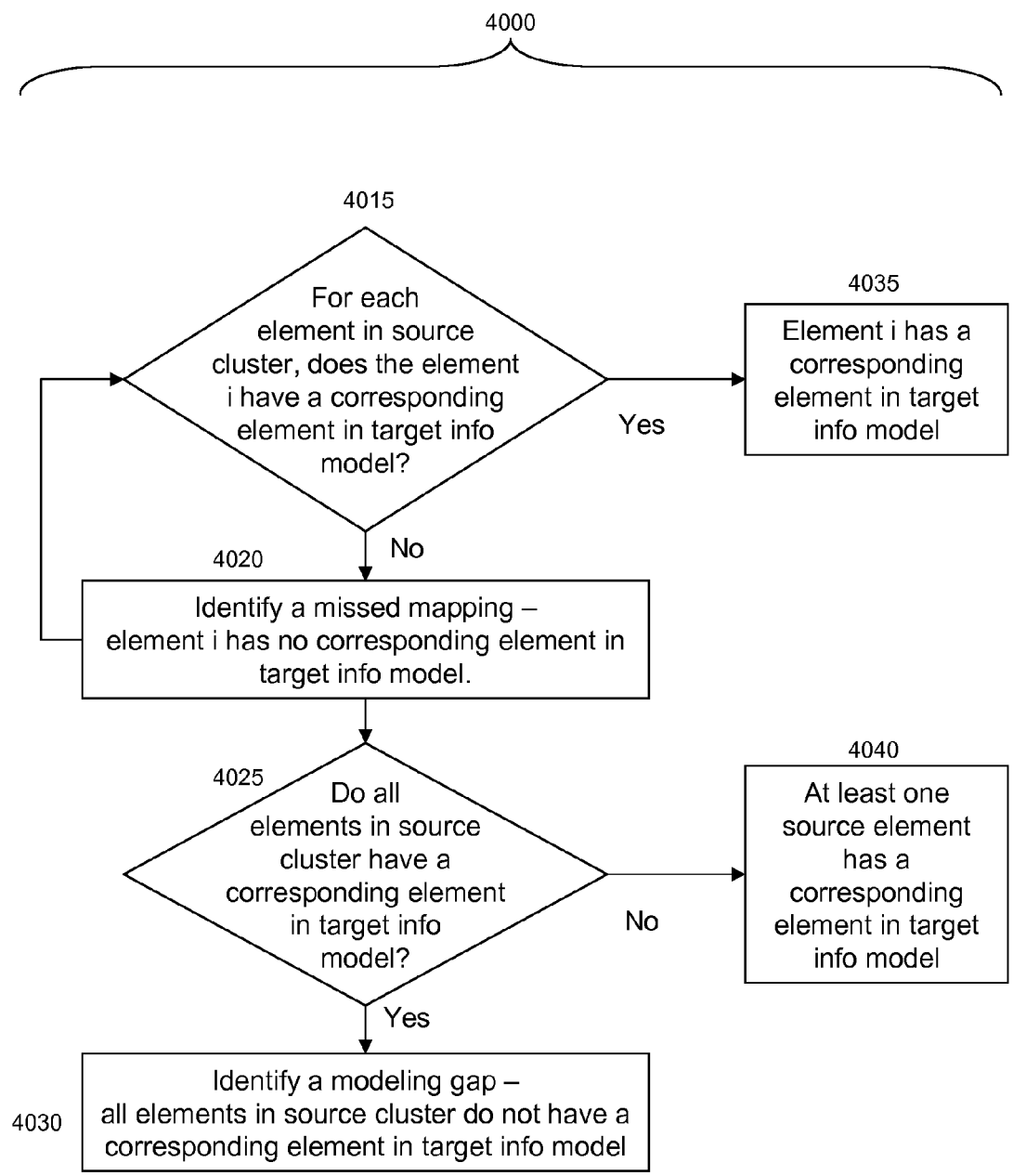
FIG. 13 is a flow chart that illustrates a computer-implemented method of evaluating a mapping of elements across information models according to an embodiment of the present invention.

Referring to FIG. 13, a flow chart illustrates a computer-implemented method of evaluating a mapping of elements across information models according to an embodiment of the present invention.

Assuming that an attempt has been made to map all elements in a cluster in a source information model to an element in a target information model, the method begins at step 4015, where a corresponding element in the target information model is sought after for each element in the source cluster. If the source element does not have a corresponding target element, then a missing mapping is identified as between that particular source element and the target element at step 4020. If there is a corresponding target element, then the method proceeds to step 4035 where it is assumed that there is no missed mapping between the source element and the target element.

At step 4025, a determination is made as to whether all elements in the source cluster have a corresponding element in the target information model. If all elements do not have a corresponding target element, then a modeling gap is identified as between the source information model and the target information model at step 4030. If at least one source element has a corresponding target element, then the method proceeds to step 4040, where it is assumed that there is no modeling gap between the source information model and the target information model.

As will be appreciated by one skilled in the art, aspects of the present invention may be embodied as a system or method (as described above) or as a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 14:
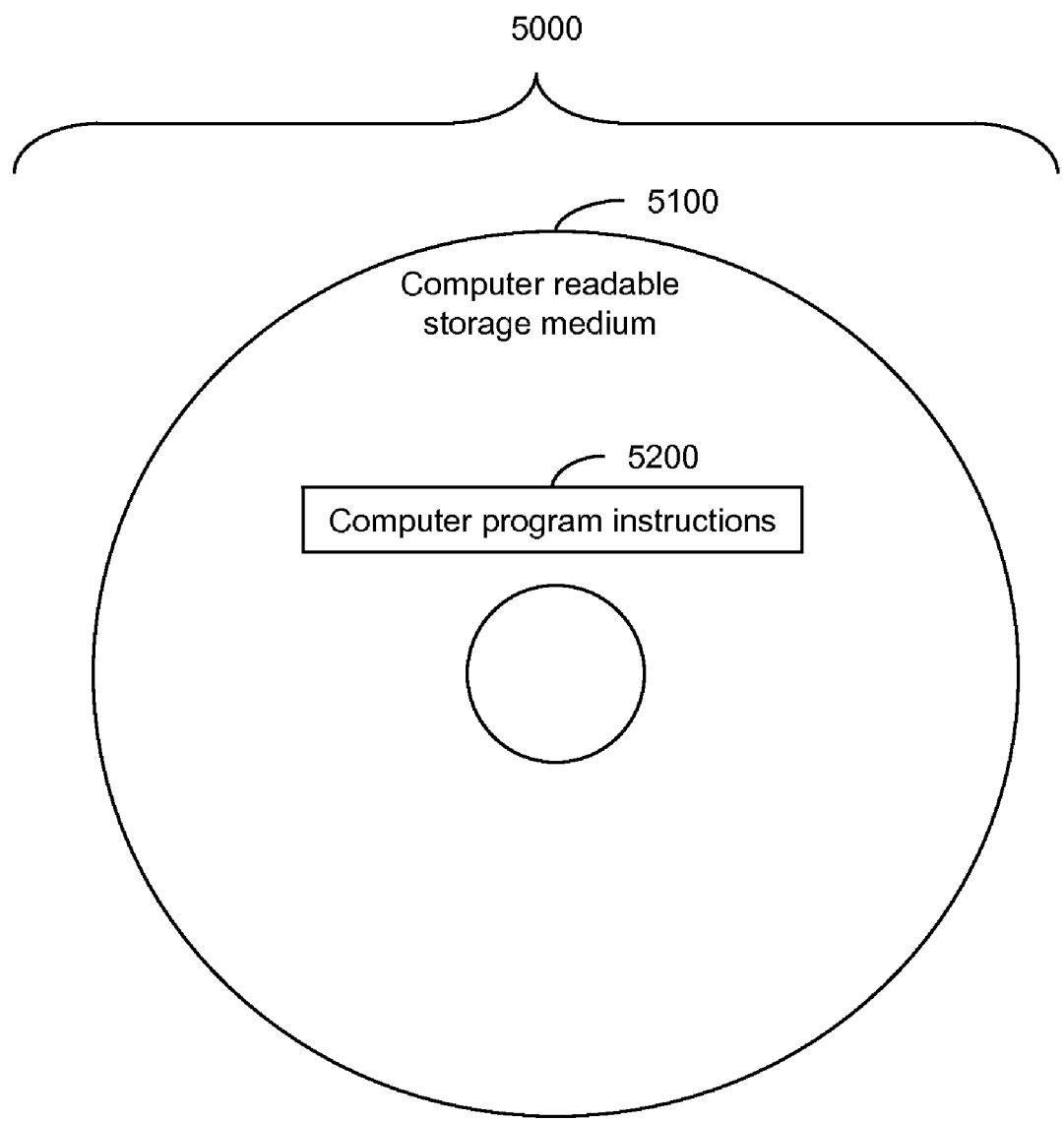
FIG. 14 is an illustration of a computer program product for carrying out the steps of the methods according to embodiments of the present invention.

FIG. 14 shows a computer program product for carrying out the steps of the methods 3000, 4000, 5000 (FIGS. 11, 12, 13) according to embodiments of the present invention. The computer program product 5000 includes computer program instructions 5200 for carrying out the steps of these methods as discussed above. As shown, computer program instructions 5200 are stored on a computer readable storage medium 5100, as discussed below.

A combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method of mapping an element of a source information model to an element of a target information model, said method comprising:

receiving, through a computer device, information that maps a first element in a source cluster to one or more elements in said target information model, wherein said source cluster is a group of one or more elements in said source information model and said group is defined based on a relationship between said one or more elements in said source information model;

mapping, through a computer device, said first element in said source cluster to said one or more elements in said target information model using said received information that maps said first element in said source cluster to said one or more elements in said target information model;

mapping, through a computer device, all other elements in said source cluster to said one or more elements in said target information model;

forming, through a computer device, a new cluster of elements in said source information model that maps said elements of said new cluster to said element in said target information model or another element in said target information model;

receiving, through a computer device, information about inter-element relationships for all elements of said source information model, and (i) grouping a first set of elements from said source information into a first cluster based on said received information about inter-element relationships for all elements of said source information model, wherein said first cluster is a cluster that can be selected as said new cluster;

(ii) obtaining a first quality metric for said first cluster;

(iii) grouping a second set of elements from said source information into a second cluster based on said received information about inter-element relationships for all elements of said source information model, wherein said second cluster is another cluster that can be selected as said new cluster;

(iv) obtaining a second quality metric for said second cluster; and (v) selecting said first cluster or said second cluster as said new cluster based on said first quality metric or said second quality metric; and obtaining, through a computer device, said first quality metric by (i) obtaining a first silhouette metric of said first cluster; and (ii) obtaining a second aggregation metric for said first cluster based on said first silhouette metric, and obtaining, through a computer device, said second quality metric for said second cluster by (i) obtaining a second silhouette metric of said second cluster; and (ii) obtaining a second aggregation metric for said second cluster based on said second silhouette metric.

2. A computer-implemented system for evaluating a cluster of elements for mapping across information models, said system comprising:

an input receiving processor that receives information that maps a first element in a source cluster to an element in said target information model, wherein said source cluster is a group of one or more elements in said source information model and said group is defined based on a relationship between said one or more elements in said source information model;

a mapping processor that (i) maps said first element in said source cluster to said element in said target information model using said received information that maps said first element in said source cluster to said element in said target information model, and (ii) maps all other elements in said source cluster to said element in said target information model;

a clustering processor that forms a new cluster of elements in said source information model that maps said elements of said new cluster to said element in said target information model or another element in said target information model;

wherein said input receiving processor further receives information about inter-element relationships for all elements of said source information model, and wherein said clustering processor further:

(i) groups a first set of elements from said source information into a first cluster based on said received information about inter-element relationships for all elements of said source information model, wherein said first cluster is a cluster that can be selected as said new cluster;

(ii) obtains a first quality metric for said first cluster;

(iii) groups a second set of elements from said source information into a second cluster based on said received information about inter-element relationships for all elements of said source information model, wherein said second cluster is another cluster that can be selected as said new cluster;

(iv) obtains a second quality metric for said second cluster; and (v) selects said first cluster or said second cluster as said new cluster based on said first quality metric or said second quality metric; and wherein said clustering processor obtains said first quality metric by (i) obtaining a first silhouette metric of said first cluster; and (ii) obtaining a second aggregation metric for said first cluster based on said first silhouette metric, and wherein said clustering processor obtains said second quality metric for said second cluster by (i) obtaining a second silhouette metric of said second cluster; and (ii) obtaining a second aggregation metric for said second cluster based on said second silhouette metric.

3. The system according to claim 2, wherein said input receiving processor further receives information about inter-element relationships for all elements of said source information model, and wherein said clustering processor further:

(i) groups a first set of elements from said source information into a first cluster based on said received information about inter-element relationships for all elements of said source information model, wherein said first cluster is a cluster that can be selected as said new cluster; and (ii) groups a second set of elements from said source information into a second cluster based on said received information about inter-element relationships for all elements of said source information model, wherein said second cluster is another cluster that can be selected as said new cluster, said system further comprising:

a quality metric processor for obtaining a first quality metric for said first cluster and for obtaining a second quality metric for said second cluster; and a cluster ranking processor for ranking said first cluster and said second cluster by comparing said first quality metric and said second quality metric.

4. The system according to claim 3, wherein said clustering processor further selects said first cluster or said second cluster as said new cluster based on said comparison by said cluster ranking processor.

5. The system according to claim 3, wherein said quality metric processor obtains said first quality metric by (i) obtaining a first silhouette metric of said first cluster; and (ii) obtaining a second aggregation metric for said first cluster based on said first silhouette metric, and wherein said quality metric processor obtains said second quality metric for said second cluster by (i) obtaining a second silhouette metric of said second cluster; and (ii) obtaining a second aggregation metric for said second cluster based on said second silhouette metric.

6. The system according to claim 2, wherein said input receiving processor further receives information for mapping a first element in said new cluster to said element in said target information model or said another element in said target information model, and wherein said mapping processor further:

(i) maps said first element in said new cluster to said element in said target information model or said another element in said target information model; and (ii) maps all other elements in said new cluster to said element in said target information model upon determining whether said first element in said new cluster has been mapped to said element in said target information model, or maps all other elements in said new cluster to said another element in said target information model upon determining whether said first element in said new cluster has been mapped to said another element in said target information model.

7. The system according to claim 4, wherein said input receiving processor further receives information for mapping a first element in said new cluster to said element in said target information model or said another element in said target information model, and wherein said mapping processor further:
(i) maps said first element in said new cluster to said element in said target information model or said another element in said target information model; and
(ii) maps all other elements in said new cluster to said element in said target information model upon determining whether said first element in said new cluster has been mapped to said element in said target information model, or maps all other elements in said new cluster to said another element in said target information model upon determining whether said first element in said new cluster has been mapped to said another element in said target information model.

8. The system according to claim 2, further comprising a mapping evaluating processor for:
(i) determining whether said first element or one of said all other elements in said source cluster has a corresponding element in said target information model, after said mapping processor maps said first element and said all other elements in said source cluster to said element in said target information model, and
(ii) identifying a missed mapping between said first element in said source cluster to a corresponding element in said target information model upon determining whether said first element in said source cluster has no corresponding element in said target information model and/or identifying a missed mapping between said one of said all other elements in said source cluster to a corresponding element in said target information model upon determining whether said one of said all other elements in said source cluster has no corresponding element in said target information model.

9. The system according to claim 8, further comprising an information model evaluating processor for identifying a modeling gap between said source information model and said target information model upon determining whether said first element and said all other elements in said source cluster have no corresponding elements in said target information model.

10. A non-transitory computer readable storage medium tangibly embodying a computer readable program code having computer readable instructions which, when implemented, cause a computer to perform the following steps:

receiving, through a computer device, information that maps a first element in a source cluster to one or more elements in said target information model, wherein said source cluster is a group of one or more elements in said source information model and said group is defined based on a relationship between said one or more elements in said source information model;

mapping, through a computer device, said first element in said source cluster to said one or more elements in said target information model using said received information that maps said first element in said source cluster to said one or more elements in said target information model;

mapping, through a computer device, all other elements in said source cluster to said one or more elements in said target information model;

forming, through a computer device, a new cluster of elements in said source information model that maps said elements of said new cluster to said element in said target information model or another element in said target information model;

receiving, through a computer device, information about inter-element relationships for all elements of said source information model, and (i) grouping a first set of elements from said source information into a first cluster based on said received information about inter-element relationships for all elements of said source information model, wherein said first cluster is a cluster that can be selected as said new cluster;
(ii) obtaining a first quality metric for said first cluster;
(iii) grouping a second set of elements from said source information into a second cluster based on said received information about inter-element relationships for all elements of said source information model, wherein said second cluster is another cluster that can be selected as said new cluster;
(iv) obtaining a second quality metric for said second cluster; and
(v) selecting said first cluster or said second cluster as said new cluster based on said first quality metric or said second quality metric; and obtaining, through a computer device, said first quality metric by (i) obtaining a first silhouette metric of said first cluster; and (ii) obtaining a second aggregation metric for said first cluster based on said first silhouette metric, and obtaining, through a computer device, said second quality metric for said second cluster by (i) obtaining a second silhouette metric of said second cluster; and (ii) obtaining a second aggregation metric for said second cluster based on said second silhouette metric.

* * * * *